Sept. 9, 1924.  
F. R. SANDSTRUM  
WIREWORKING TOOL  
Filed July 25, 1923
1,508,071
2 Sheets-Sheet 1
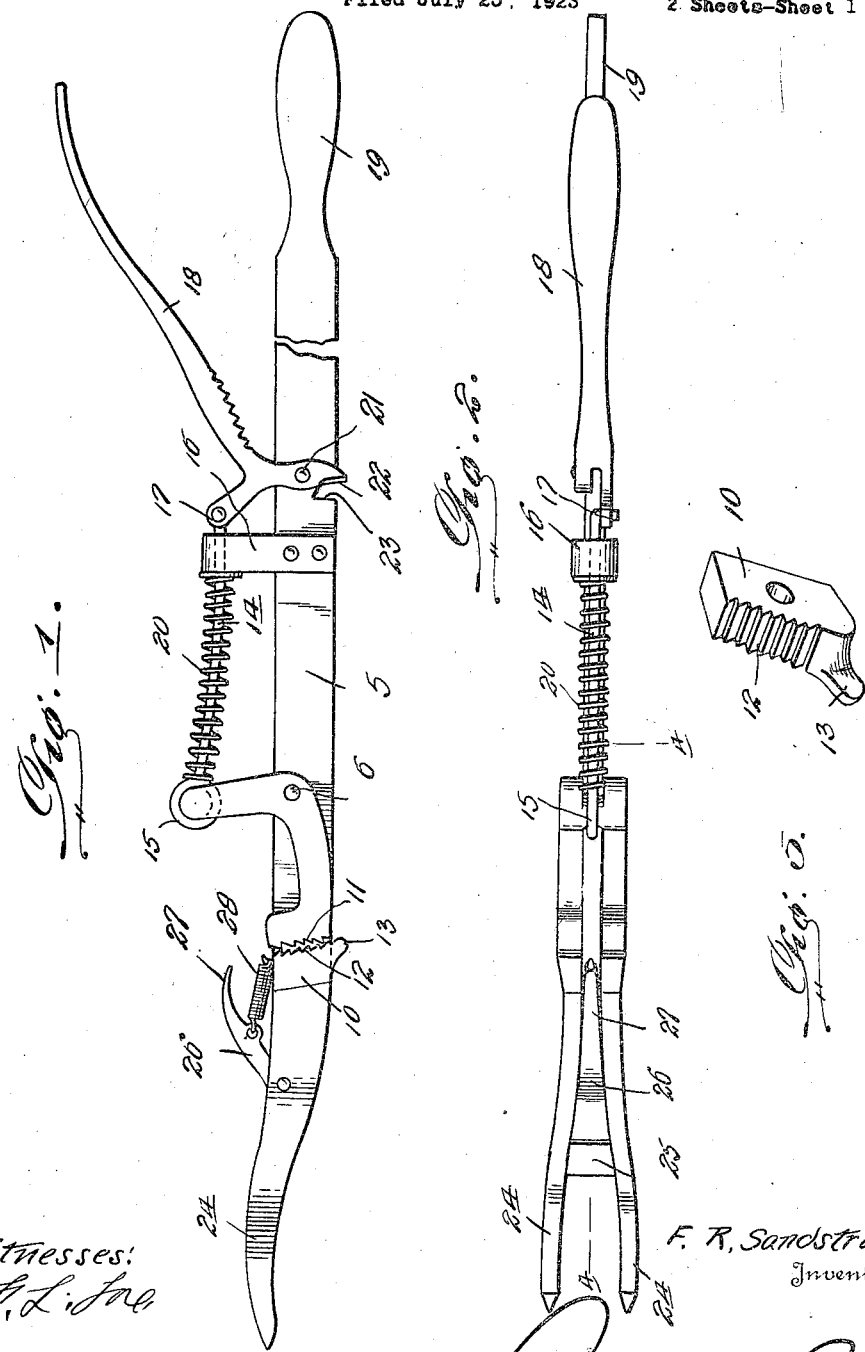

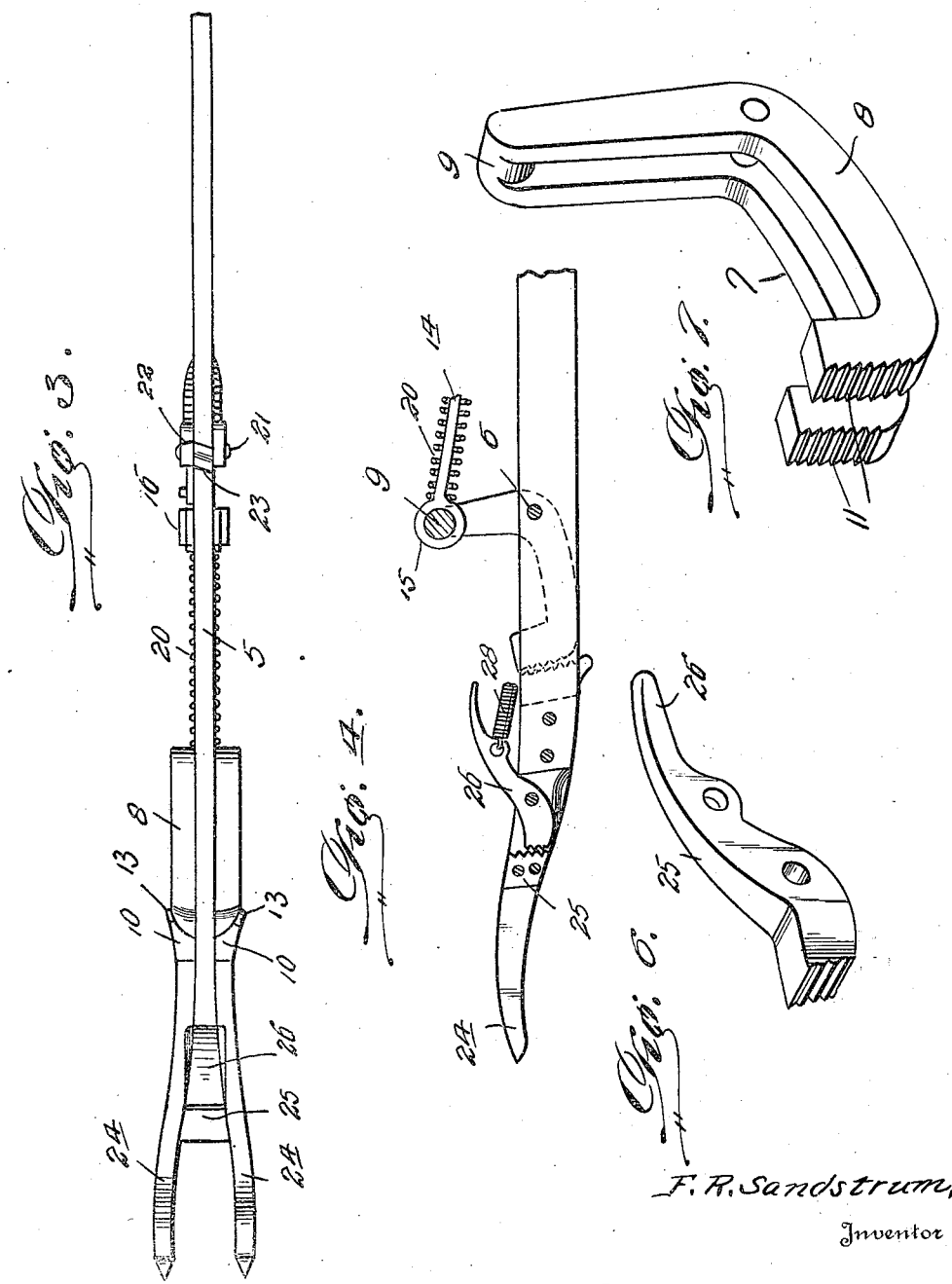

Patented Sept. 9, 1924.

1,508,071

UNITED STATES PATENT OFFICE.

FRANK R. SANDSTRUM, OF DEXTER, KANSAS.

WIREWORKING TOOL.

Application filed July 25, 1923. Serial No. 653,647.

*To all whom it may concern:*

Be it known that FRANK R. SANDSTRUM, a citizen of the United States, residing at Dexter, in the county of Cowley and State of Kansas, has invented certain new and useful Improvements in Wireworking Tools, of which the following is a specification.

This invention relates to wire-working tools, and has for its object to provide certain new and useful improvements in such devices as to enable the convenient handling thereof, particularly in working upon wire fences, to stretch, splice, cut and otherwise handle the runner-wires in a simple and efficient manner.

Another feature of the invention is to provide a device of the above kind wherein rear wire clamps are provided at both sides of the handle member so that the device will present a clamp at the upper side of the handle, irrespective of which side of the handle is disposed upwardly, as governed by the direction in which the stretching operation is performed.

Other features will become apparent as the nature of the invention is better understood, and the same consists in the novel form, combination and arrangement of parts hereinafter more fully described, shown in the accompanying drawings and claimed.

In the drawings, wherein like reference characters indicate corresponding parts throughout the several views, Figure 1 is a side elevational view of a wire-working tool constructed in accordance with the present invention, and partly broken away, Figure 2 is a rear elevational view of the device shown in Figure 1, Figure 3 is a front elevational view of the same, Figure 4 is a fragmentary, longitudinal, sectional view taken substantially upon line line 4—4 of Figure 2, Figure 5 is a perspective view of one of the side clamping jaws of the handle member, Figure 6 is a view similar to Figure 5 of the forward pivotal clamping member, and Figure 7 is an enlarged perspective view of the rear pivotal clamping member.

Referring more in detail to the drawing, the invention embodies a handle member 5 having a rear or inner clamping member pivoted thereto as at 6, so as to swing across the handle member. The rear clamping member is of bell-crank form in side elevation, as shown, and is longitudinally bifurcated to provide a pair of parallel spaced arms 7 and 8, which are respectively located against opposite sides of the handle member 5, and which are preferably connected at their rear upper ends by means of an integral transverse connecting member 9, which is preferably of circular cross section, as shown in Figure 4, for a purpose which will presently become apparent.

The handle member 5 extends forwardly beyond the members 7 and 8 and has a pair of clamping jaws 10 rigidly attached to the sides of the same in an oblique position, as shown in Figure 1, so as to provide cam shoulders, each of which cooperates with the adjacent end of one of the arms 7 and 8 for providing a pair of wire clamps. In order to insure proper gripping engagement with the wire, the clamping ends of the arms 7 and 8 are provided with gripping teeth 11 cooperating with the gripping teeth 12 on the adjacent faces of the fixed jaws 10. Also, in order to retain the wire between the clamping members against accidental lateral displacement therefrom while the arms 7 and 8 are released, rearwardly and downwardly projecting lugs 13 are formed on the outer sides of the jaws 10.

A link 14 has its forward end provided with an eye 15, pivotally engaged with the connecting portion 9 of the arms 7 and 8, and this link extends rearwardly and is slidable through a guide strap 16 which is fixed to the handle member 5, the rear end of the link 14 being pivoted as at 17 to an arm of an angular lever 18 which is of such form as to be grasped with the hand-hold portion 19 of the handle member 5 when it is desired to release the rear pair of wire clamps. The rear clamps are normally operative for clamping the wire through the provision of a helical compression spring 20 which surrounds the link 14 between the eye 15 and the guide 16. The lever 18 is pivoted as at 21 to the handle member 5, rearwardly of the guide 16, and is formed with an extension in the form of a wire-cutting blade 22 which cooperates with a sharpened edge 23 provided at one side of a notch formed in the handle member. The outer end of the handle member 5 is bifurcated and longitudinally curved to provide spurs 24 and a suitable clamping jaw 25 is rigidly fixed between the bifurcations of the handle member for cooperating with a pivotal wire-clamping member 26 to form a forward wire clamp. The pivotal clamping member 26 is disposed and pivoted between the bifurcations of the handle member inwardly of the jaw 25 and has a rearwardly extending figure piece 27 adapted to be lifted for releasing the clamp, the latter being normally operative through the provision of a tension spring 28 attached to the handle member and to the clamp member 26.

From the above description it will be seen that a pair of rear wire clamps are provided, one of the same being disposed at each side of the handle member so that the wire may be clamped at the upper side of the handle irrespective of which side of the handle is disposed upwardly so that engagement of the wire with the present device is made easy and the possibility of encountering difficulty in the use of the improved implement is eliminated. Also, the provision of the lever 18 adjacent the hand-hold 19 enables operation of the handle and the rear clamps by means of one hand, thereby leaving the other hand free for any other desired purposes, such as effecting positioning of the wire in the respective clamps.

Among the many uses to which the present implement may be put will be mentioned the following:

The claw may be employed for pulling staples, etc. Any one of the wire clamping devices may be engaged with a runner-wire and the claw end of the implement applied to a post as a fulcrum and the device then used as a lever to stretch the wire. The adjacent ends of the broken wire may be engaged with either one of the rear clamping devices and also with the front clamping device so that if the implement is then turned around the wire as an axis, the wires will be intertwisted for connecting the same.

While I have shown the implement as composed of individual members including a handle member with the several fixed clamping jaws attached thereto, it is apparent that these may be formed integral without departing from the spirit and scope of the invention as claimed.

What I claim as new is:

An implement of the class described comprising a handle member, a pair of spaced parallel wire clamping members pivoted to the handle member at opposite sides of the latter, said handle member projecting forwardly beyond said clamping members and having rigid jaws upon opposite sides of its projecting portion to form shoulders cooperating with the forward ends of said clamping members to produce wire clamps at opposite sides of the handle, the projecting portion of the handle being bifurcated, and a pivotal wire clamping member mounted in the bifurcation of the handle, and a fixed jaw member mounted in the bifurcation of the handle member forwardly of said pivotal wire clamping member and cooperating with the latter to provide a forward wire clamp, said pair of parallel clamping members being of bell crank form in elevation and connected at their rear ends by means of a circular connection, a guide fixed upon the handle member rearwardly of said pair of clamping members, a link slidable through said guide and having its forward end pivotally engaged with the circular connecting member, a spring encircling said link between the guide and a pair of clamping members for normally maintaining the latter in clamping position, and an angular lever pivoted to the handle member and to the link rearwardly of the guide and adapted to be grasped by one hand of the operator together with the adjacent portion of the handle member for releasing said pair of clamping members against the action of said spring.

FRANK R. SANDSTRUM.